(12) United States Patent
Zhou (10) Patent No.: US 11,714,502 B2
(45) Date of Patent: Aug. 1, 2023

(54) TOUCH DISPLAY PANEL AND DISPLAY DEVICE

(71) Applicant: TCL China Star Optoelectronics Technology Co., Ltd., Guangdong (CN)

(72) Inventor: Kaifeng Zhou, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 308 days.

(21) Appl. No.: 17/251,876

(22) PCT Filed: Oct. 27, 2020

(86) PCT No.: PCT/CN2020/123994
§ 371 (c)(1),
(2) Date: Dec. 14, 2020

(87) PCT Pub. No.: WO2022/077558
PCT Pub. Date: Apr. 21, 2022

(65) Prior Publication Data
US 2022/0317793 A1 Oct. 6, 2022

(30) Foreign Application Priority Data
Oct. 16, 2020 (CN) .......................... 202011108455.7

(51) Int. Cl.
*G06F 3/041* (2006.01)
*G06F 3/046* (2006.01)

(52) U.S. Cl.
CPC ............ *G06F 3/0412* (2013.01); *G06F 3/046* (2013.01)

(58) Field of Classification Search
CPC ............................... G06F 3/0412; G06F 3/046
See application file for complete search history.

(56) References Cited

U.S. PATENT DOCUMENTS

2014/0085214 A1    3/2014  Cok
2020/0341575 A1 * 10/2020  Hsu .................. G06F 3/0412

FOREIGN PATENT DOCUMENTS

| CN | 106445240 | 2/2017 |
|---|---|---|
| CN | 110580118 | 12/2019 |
| CN | 110928014 | 3/2020 |
| CN | 211293912 | 8/2020 |

* cited by examiner

*Primary Examiner* — Lisa S Landis (57) ABSTRACT

The present application provides a touch display panel and a display device. The touch display panel includes a substrate and a plurality of pixel electrodes. The plurality of pixel electrodes are disposed on the substrate in an array, wherein each of the pixel electrodes includes a first trunk portion and a second trunk portion that are arranged intersecting with each other. The present application realizes touch display integration of the touch display panel by setting a first touch electrode corresponding to the first trunk portion and setting a second touch electrode corresponding to the second trunk portion on the substrate.

18 Claims, 4 Drawing Sheets

TOUCH DISPLAY PANEL AND DISPLAY DEVICE

RELATED APPLICATIONS

This application is a National Phase of PCT Patent Application No. PCT/CN2020/123994 having International filing date of Oct. 27, 2020, which claims the benefit of priority of Chinese Patent Application No. 202011108455.7 filed on Oct. 16, 2020. The contents of the above applications are all incorporated by reference as if fully set forth herein in their entirety.

FIELD AND BACKGROUND OF THE INVENTION

The present application relates to the display field, and particularly to a touch display panel and a display device.

With the development of touch technology, electronic devices with touch function are widely used in people's life and work. Display panels with touch function has become a research hotspot in the field of display. Touch display panels can be classified into capacitive, electromagnetic, resistive, and optical types.

The electromagnetic touch display panel in the prior art usually uses an external hanging electromagnetic touch panel, and the external hanging electromagnetic touch panel and a display panel are combined to form the electromagnetic touch display panel. An overall thickness of the electromagnetic touch display panel is relatively large, and production cost is relatively high.

SUMMARY OF THE INVENTION

The present application provides a touch display panel and a display device to solve the technical problems of large thickness and high cost of the touch display panel in the prior art.

A touch display panel, comprising:
a substrate;
a plurality of pixel electrodes disposed on the substrate in an array, wherein each of the pixel electrodes comprises a first trunk portion and a second trunk portion that are arranged intersecting with each other;
a plurality of first touch electrodes disposed on the substrate along a first direction, wherein each of the first touch electrodes is arranged correspondingly to the first trunk portion; and
a plurality of second touch electrodes disposed on the substrate along a second direction, wherein each of the second touch electrodes is arranged correspondingly to the second trunk portion.

In the touch display panel provided by the present application, each of the first touch electrodes comprises a plurality of first spacers arranged at intervals and a plurality of first connecting portions arranged between adjacent first spacers;
wherein a projection of the first trunk portion on the substrate correspondingly covers a projection of the first spacers on the substrate.

In the touch display panel provided by the present application, each of the second touch electrodes comprises a plurality of second spacers arranged at intervals and a plurality of second connecting portions arranged between adjacent second spacers;

wherein a projection of the second trunk portion on the substrate correspondingly covers a projection of the second spacers on the substrate.

In the touch display panel provided by the present application, a width of the first connecting portions is greater than a width of the first spacers, and a width of the second connecting portions is greater than a width of the second spacers.

In the touch display panel provided by the present application, each of the first touch electrodes comprises a plurality of first touch sub-electrodes connected in parallel, and each of the first touch sub-electrodes is arranged correspondingly to the first trunk portion located in a same row.

In the touch display panel provided by the present application, each of the second touch electrodes comprises a plurality of second touch sub-electrodes connected in parallel, and each of the second touch sub-electrodes is arranged correspondingly to the second trunk portion located in a same column.

In the touch display panel provided by the present application, the touch display panel further comprises a plurality of data lines arranged along the first direction and a plurality of scan lines arranged along the second direction;
wherein the first touch electrodes and the data lines are arranged in a same layer, the second touch electrodes and the scan lines are arranged in a same layer.

In the touch display panel provided by the present application, the touch display panel further comprises a first connecting line and a second connecting line, and each of the first touch electrodes and each of the second touch electrodes comprise a first end and a second end that are oppositely disposed;
wherein the first ends of the plurality of first touch electrodes are electrically connected to the first connecting line, and the first ends of the plurality of second touch electrodes are electrically connected to the second connecting line; and
wherein the second end of one of the first touch electrodes and the second end of one of the second touch electrodes are both connected to a reference voltage.

In the touch display panel provided by the present application, the touch display panel further comprises a display region and a non-display region set around the display region, and the first connecting line and the second connecting line are located in the non-display region.

In the touch display panel provided by the present application, the first touch electrodes and the second touch electrodes are made of a material comprising any one kind of copper, aluminum, silver, or molybdenum.

In the touch display panel provided by the present application, the first trunk portion located in a same row is arranged correspondingly to one of the first touch electrodes, and the second trunk portion located in a same column is arranged correspondingly to one of the second touch electrodes.

Correspondingly, the present application also provides a display device, comprising a touch display panel, the touch display panel comprising:
a substrate;
a plurality of pixel electrodes disposed on the substrate in an array, wherein each of the pixel electrodes comprises a first trunk portion and a second trunk portion that are arranged for intersecting with each other;
a plurality of first touch electrodes disposed on the substrate along a first direction, wherein each of the first touch electrodes is arranged correspondingly to the first trunk portion; and a plurality of second touch electrodes disposed on the substrate along a second direction, wherein each of the second touch electrodes is arranged correspondingly to the second trunk portion.

In the display device provided by the present application, each of the first touch electrodes comprises a plurality of first spacers arranged at intervals and a plurality of first connecting portions arranged between adjacent first spacers;

wherein a projection of the first trunk portion on the substrate correspondingly covers a projection of the first spacers on the substrate.

In the display device provided by the present application, each of the second touch electrodes comprises a plurality of second spacers arranged at intervals and a plurality of second connecting portions arranged between adjacent second spacers;

wherein a projection of the second trunk portion on the substrate correspondingly covers the projection of the corresponding second spacers on the substrate.

In the display device provided by the present application, a width of the first connecting portion is greater than a width of the first spacer, and a width of the second connecting portion is greater than a width of the second spacer.

In the display device provided by the present application, each of the first touch electrodes comprises a plurality of first touch sub-electrodes connected in parallel, and each of the first touch sub-electrodes is arranged correspondingly to the first trunk portion located in a same row.

In the display device provided by the present application, each of the second touch electrodes comprises a plurality of second touch sub-electrodes connected in parallel, and each of the second touch sub-electrodes is arranged correspondingly to the second trunk portion located in a same column.

In the display device provided by the present application, the touch display panel further comprises a plurality of data lines arranged along the first direction and a plurality of scan lines arranged along the second direction;

wherein the first touch electrodes and the data lines are arranged in a same layer, and the second touch electrodes and the scan lines are arranged in a same layer.

In the display device provided by the present application, the touch display panel further comprises a first connecting line and a second connecting line, and each of the first touch electrodes and each of the second touch electrodes comprise a first end and a second end that are oppositely disposed;

wherein the first ends of the plurality of first touch electrodes are electrically connected to the first connecting line, and the first ends of the plurality of second touch electrodes are electrically connected to the second connecting line; and wherein the second end of one of the first touch electrodes and the second end of one of the second touch electrodes are both connected to a reference voltage.

In the display device provided by the present application, the touch display panel further comprises a display region and a non-display region set around the display region, and the first connecting line and the second connecting line are located in the non-display region.

The present application provides a touch display panel and a display device. The touch display panel comprises a substrate; a plurality of pixel electrodes disposed on the substrate in an array, wherein each of the pixel electrodes comprises a first trunk portion and a second trunk portion that are arranged intersecting with each other; a plurality of first touch electrodes disposed on the substrate along a first direction, wherein each of the first touch electrodes is arranged correspondingly to the first trunk portion; and a plurality of second touch electrodes disposed on the substrate along a second direction, wherein each of the second touch electrodes is arranged correspondingly to the second trunk portion. The present application realizes touch display integration of the touch display panel by arranging the first touch electrode corresponding to the first trunk portion and arranging the second touch electrode corresponding to the second trunk portion on the substrate, which is beneficial to thinning and reducing production cost.

BRIEF DESCRIPTION OF THE SEVERAL VIEWS OF THE DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DESCRIPTION OF SPECIFIC EMBODIMENTS OF THE INVENTION

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

Figure 1:
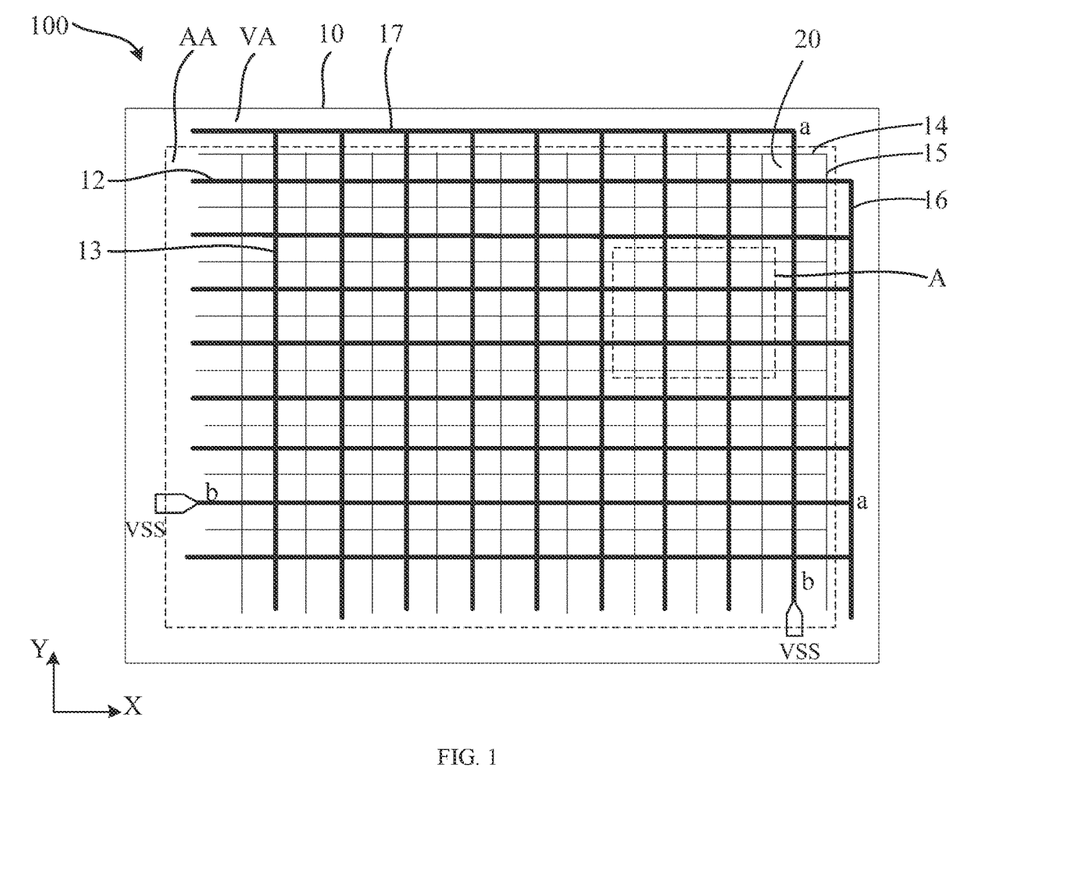
FIG. 1 is a first structural schematic diagram of a touch display panel of the present application.
Figure 2:
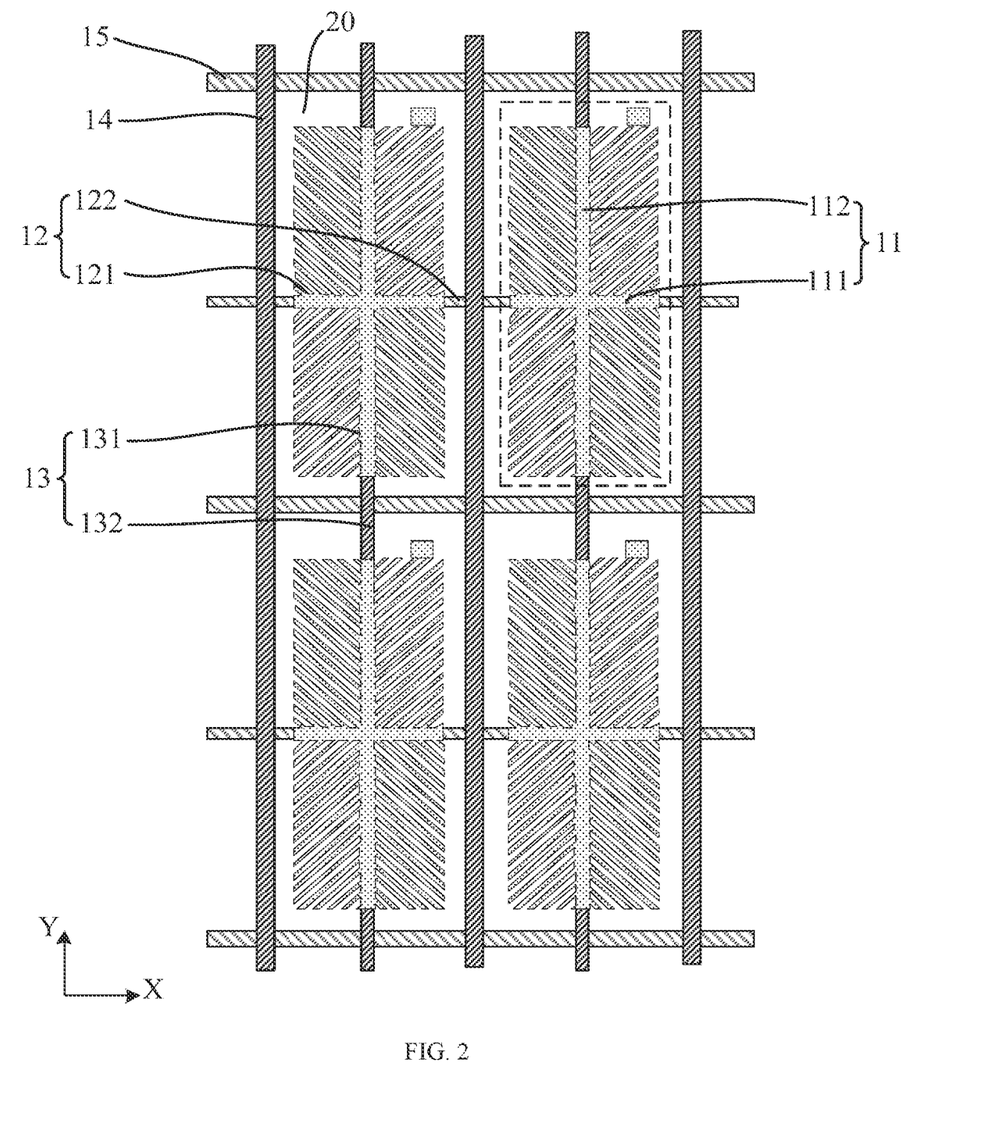
FIG. 2 is an amplified structural schematic diagram of A in FIG. 1.

Referring to FIG. 1 and FIG. 2, FIG. 1 is a first structural schematic diagram of a touch display panel of the present application. FIG. 2 is an amplified structural schematic diagram of A in FIG. 1.

In the embodiment of the present application, the touch display panel 100 comprises a substrate 10; a plurality of pixel electrodes 11 disposed on the substrate 10 in an array, wherein each of the pixel electrodes 11 comprises a first trunk portion 111 and a second trunk portion 112 that are arranged for intersecting with each other; a plurality of first touch electrodes 12 disposed on the substrate 10 along a first direction X, wherein each of the first touch electrodes 12 is arranged correspondingly to the first trunk portion 111; and a plurality of second touch electrodes 13 disposed on the substrate 10 along a second direction Y, wherein each of the second touch electrodes 13 is arranged correspondingly to the second trunk portion 112.

The substrate 10 may be a glass substrate, a plastic substrate or a flexible substrate.

Each pixel electrode 11 may be divided into a four-domain pixel electrode or an eight-domain pixel electrode by the first trunk portion 111 and the second trunk portion 112. The embodiments of the present application are introduced by taking a four-domain pixel electrode as an example, but it should not be understood as a limitation of the present application.

The pixel electrode 11 is made of transparent conductive material such as indium tin oxide or indium zinc oxide.

A material of the first touch electrode 12 and the second touch electrode 13 comprises non-transparent materials with low resistivity such as copper, aluminum, silver, or molybdenum; or A material of the first touch electrode 12 and the second touch electrode 13 comprises material of transparent materials with low resistivity such as indium tin oxide, indium zinc oxide, carbon nanotube or graphene. The specific selection can be made according to actual demand, which is not specifically limited in the present application.

It should be noted that in the embodiments of the present application, the terms "first" and "second" are only used for descriptive purposes, and cannot be understood as indicating or implying relative importance or implicitly indicating the number of indicated technical features. For example, in the embodiment of the present application, the number of the first touch electrodes 12 and the second touch electrodes 13 can be set according to the requirement of the touch sensitivity of the touch display panel 100, which is not specifically limited in the present application.

The embodiment of the present application provides a touch display panel 100. The touch display panel 100 is provided with pixel electrodes 11 arranged in an array. Each pixel electrode 11 comprises a first trunk portion 111 and a second trunk portion 112. The first trunk portion 111 and the second trunk portion 112 are located at the junction of different domains in the pixel electrode 11, and liquid crystals at the junction are dark without the control of electric field. Therefore, by arranging the first touch electrode 12 corresponding to the first trunk portion 111 and arranging the second touch electrode 13 corresponding to the second trunk portion 112, the touch display integration of the touch display panel 100 is realized compared with the prior art, which is beneficial to the thinning of the touch display panel 100 and does not affect the aperture ratio of the touch display panel 100.

In an embodiment of the present application, the first trunk portion 111 located in the same row is arranged correspondingly to the first touch electrode 12, and the second trunk portion 112 located in the same column is arranged correspondingly to the second touch electrode 13. Therefore, the first touch electrode 12 and the second touch electrode 13 are evenly disposed on the substrate 10 to prevent uneven display of the touch display panel 100, thereby improving the display quality.

In another embodiment of the present application, two adjacent first touch electrodes 12 can be arranged at intervals of multiple rows of the first trunk portion 111. However, the number of rows of the first trunk portion 111 between any two adjacent first touch electrodes 12 is equal to reduce the influence on the display image. Similarly, the two adjacent second touch electrodes 13 can be arranged at intervals of multiple columns of the second trunk portion 112. However, the number of columns of the second trunk portion 112 between any two adjacent second touch electrodes 13 is equal.

Specifically, the number of rows of the first trunk portion 111 between two adjacent first touch electrodes 12 and the number of columns of the second trunk portion 112 between two adjacent second touch electrodes 13 can be arranged according to the size of the touch display panel 100 and the touch sensitivity requirements of the touch display panel 100, which are not specifically limited in the present application.

In addition, since the resistance values of the first touch electrode 12 and the second touch electrode 13 affect the touch sensitivity of the touch display panel 100, while the resistance values of the first touch electrode 12 and the second touch electrode 13 are inversely proportional to their width, the greater the width of the first touch electrode 12 and the second touch electrode 13, the higher the touch sensitivity. However, the width of the first touch electrode 12 and the width of the second touch electrode 13 will affect the aperture ratio of the touch display panel 100. Therefore, the width of the first touch electrode 12 and the second touch electrode 13 needs to be selected according to the touch sensitivity and aperture ratio requirements of the touch display panel 100.

For example, in an embodiment of the present application, the width of the first touch electrode 12 is less than or equal to the width of the corresponding first trunk portion 111, and the width of the second touch electrode 13 is less than or equal to the width of the corresponding second trunk portion 112. Therefore, the first touch electrode 12 and the second touch electrode 13 are located in the non-display region of the touch display panel 100 as much as possible to prevent affecting the aperture ratio of the touch display panel 100.

In another embodiment of the present application, a width of the first touch electrode 12 is greater than a width of the corresponding first trunk portion 111, and a width of second touch electrode 13 is greater than a width of the corresponding second trunk portion 112. Therefore, the resistance values of the first touch electrode 12 and the second touch electrode 13 are small, and the touch sensitivity of the touch display panel 100 is improved on the basis of sacrificing a certain aperture ratio.

Referring to FIG. 2, in the touch display panel 100 provided by the present application, each of the first touch electrodes 12 comprises a plurality of first spacers 121 arranged at intervals and a plurality of first connecting portions 122 arranged between adjacent first spacers 121. And a projection of the first trunk portion 111 on the substrate correspondingly covers a projection of the first spacers 121 on the substrate.

Similarly, each of the second touch electrodes 13 comprises a plurality of second spacers 131 arranged at intervals and a plurality of second connecting portion 132 arranged between adjacent second spacers 131. And a projection of the second trunk portion 112 on the substrate 10 correspondingly covers the projection of the second spacer 131 on the substrate 10.

In this embodiment, the first trunk portion 111 is configured to cover the corresponding first spacer 121, and the second trunk portion 112 is configured to cover the corresponding second spacer 131, which can effectively prevent the influence of the first trunk portion 111 and the second trunk portion 112 on the aperture ratio of the touch display panel 100.

Further, in an embodiment of the present application, a width of the first spacer 121 is equal to a width of the first connecting portion 122, and a width of the second spacer 131 is equal to a width of the second connecting portion 132, which can reduce the difficulty of the process. Meanwhile, the display uniformity of the touch display panel 100 is improved.

Of course, in another embodiment of the present application, a width of the first connecting portion 122 may be greater than a width of the first spacer 121, and a width of the second connecting portion 132 may be greater than a width of the second spacer 131.

It can be understood that since the first spacer 121 is arranged correspondingly to the first trunk portion 111, in order not to affect the aperture ratio of the touch display panel 100, a width of the first spacer 121 is limited by the corresponding first trunk portion 111. The same is true for the second spacer 131. The first connecting portion 122 is arranged between adjacent pixel electrodes 11 in the same row. The second connecting portion 132 is arranged between adjacent pixel electrodes 11 in the same column. Therefore, the first connecting portion 122 and the second connecting portion 132 will not affect the aperture ratio of the touch display panel 100.

Therefore, in this embodiment, by making a width of the first connecting portion 122 greater than a width of the first spacer 121 and a width of the second connecting portion 132 greater than a width of the second spacer 131, the resistance values of the first touch electrode 12 and the second touch electrode 13 can be further reduced, and the touch sensitivity can be improved without affecting the aperture ratio of the touch display panel 100.

Referring to FIG. 1, in the embodiment of the present application, the touch display panel 100 further comprises a plurality of data lines 14 arranged along the first direction X and a plurality of scan lines 15 arranged along the second direction Y. The data line 14 and the scan line 15 are cross arranged to form a plurality of sub-pixels 20 arranged in an array. Each pixel electrode 11 is arranged correspondingly to a sub-pixel 20.

The data line 14 and the scan line 15 can be made of conductive materials such as copper, aluminum, silver, or molybdenum.

Optionally, the first touch electrode 12 and the data line 14 are arranged in the same layer, and the second touch electrode 13 and the scan line 15 are arranged in the same layer, which can simplify the process and further reduce the production cost.

Of course, in another embodiment of the present application, the first touch electrode 12 and the data line 14 are arranged in different layers, and/or, the second touch electrode 13 and the scan line 15 are arranged in different layers, which can prevent problems such as short circuit or signal crosstalk caused by overly dense signal lines.

Further, the touch display panel 100 further comprises a first connecting line 16 and a second connecting line 17. Each of the first touch electrodes 12 and each of the second touch electrodes 13 comprise a first end a and a second end b that are oppositely disposed. The first ends a of the plurality of first touch electrodes 12 are electrically connected to the first connecting line 16. And the first ends a of the plurality of second touch electrodes 13 are electrically connected to the second connecting line 17. The second end b of one of the first touch electrodes 12 and the second end b of one of the second touch electrodes 13 are connected to a reference voltage VSS.

Wherein, the reference voltage VSS may be a ground voltage or any low-level signal with a small voltage value, which can be selected according to the actual demand and is not specifically limited in the present application.

In this embodiment, the touch display panel comprises a display region AA and a non-display region VA set around the display region AA. The first connecting line 16 and the second connecting line 17 are located in the non-display region VA, and the first connecting line 16 is arranged along the second direction Y, and the second connecting line 17 is arranged along the first direction X, which can prevent the first connecting line 16 and the second connecting line 17 from affecting the aperture ratio of the touch display panel 100 and improve the display quality.

In addition, since the first ends a of the plurality of first touch electrodes 12 are electrically connected to the first connecting line 16, even if only the second end b of one of the first touch electrodes 12 is connected to a reference voltage VSS, the other first touch electrodes 12 for detection can form a detection loop with the first touch electrode 12 connected to a reference voltage VSS. The number of detection loops is much greater than that of the existing coil structure, thereby improving the accuracy of touch detection. The same is true for the second touch electrode 13, which will not be repeated here.

Figure 3:
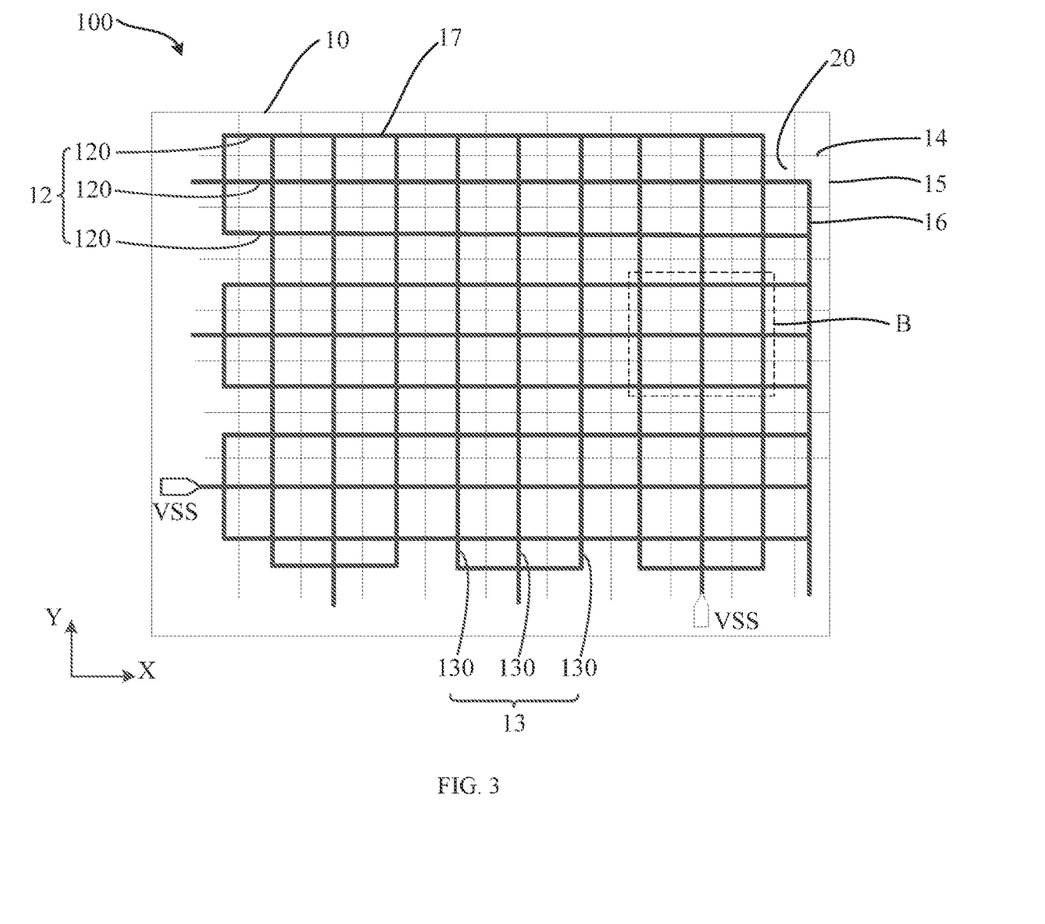
FIG. 3 is a second structural schematic diagram of the touch display panel of the present application.
Figure 4:
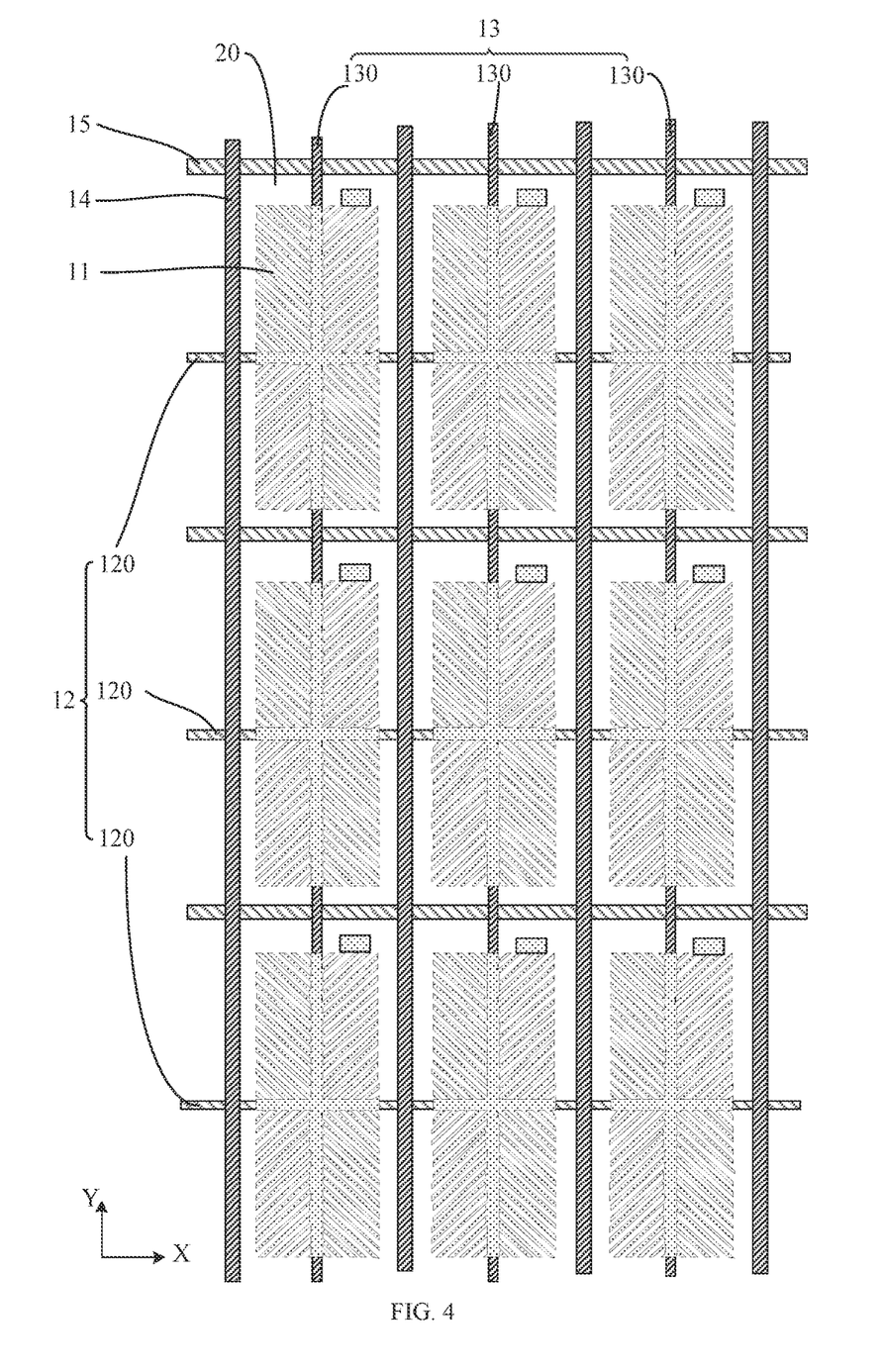
FIG. 4 is an amplified structural schematic diagram of B in FIG. 3.

Referring to FIG. 3 and FIG. 4, FIG. 3 is a second structural schematic diagram of a touch display panel 100 of the present application, FIG. 4 is an amplified structural schematic diagram of B in FIG. 3.

Different from the touch display panel 100 shown in FIG. 1, in the touch display panel 100 provided by this embodiment, each of the first touch electrodes 12 comprises a plurality of first touch sub-electrodes 120 connected in parallel, and each of the first touch sub-electrodes 120 is arranged correspondingly to the first trunk portion 111 located in the same row.

Accordingly, each of the second touch electrodes 13 comprises a plurality of second touch sub-electrodes 130 connected in parallel, and each of the second touch sub-electrodes 130 is arranged correspondingly to the second trunk portion 112 located in the same column.

Wherein, the number of the first touch sub-electrodes 120 included in each first touch electrode 12 and the number of the second touch sub-electrodes 130 included in each second touch electrode 13 can be designed according to the actual demand, which is not specifically limited in the present application.

It can be seen from the above that the width of the first touch electrode 12 and the second touch electrode 13 will affect the touch sensitivity of the touch display panel 100. Therefore, in this embodiment, each first touch electrode 12 is arranged as a plurality of first touch sub-electrodes 120 connected in parallel, and each second touch electrode 13 is arranged as a plurality of second touch sub-electrodes 130 connected in parallel, which will effectively reduce the resistance values of the first touch electrode 12 and the second touch electrode 13. At the same time, the width of the first touch sub-electrodes 120 and the second touch sub-electrodes 130 can be set narrower to prevent affecting the aperture ratio of the touch display panel 100.

Accordingly, the present application also provides a display device. The display device comprises a touch display panel described in any of the above embodiments. The touch display panel can refer to the above contents for details, and will not be repeated here. In addition, the display device can be a smart phone, a tablet computer, an e-book reader, a smart watch, a camera, a game machine, etc., which is not limited in the present application.

The present application provides a display device. The display device comprises the touch display panel. The touch display panel comprises a substrate; a plurality of pixel electrodes disposed on the substrate in an array, wherein each of the pixel electrodes comprises a first trunk portion and a second trunk portion that are arranged for intersecting with each other; a plurality of first touch electrodes disposed on the substrate along a first direction, wherein each of the first touch electrodes is arranged correspondingly to the first trunk portion; and a plurality of second touch electrodes disposed on the substrate along a second direction, wherein each of the second touch electrodes is arranged correspondingly to the second trunk portion. The present application realizes touch display integration of the touch display panel by arranging the first touch electrode corresponding to the first trunk portion and arranging the second touch electrode corresponding to the second trunk portion on the substrate, which is beneficial to thinning and does not affect the aperture ratio of the touch display panel, so as to improve the quality of display device.

The touch display panel and display device provided by the present application are described in detail above. Specific examples are used in this application to explain the principles and implementations of the application. The description of the above embodiments is only used to help understand the method and core ideas of the application. At the same time, for those of ordinary skill in the art, according to the ideas of this application, there will be changes in the specific implementation and scope of application. In summary, the content of this specification should not be construed as a reference limits.

What is claimed is:

1. A touch display panel, comprising:
a substrate;
a plurality of pixel electrodes disposed on the substrate in an array, wherein each of the pixel electrodes comprises a first trunk portion and a second trunk portion that are arranged intersecting with each other;
a plurality of first touch electrodes disposed on the substrate along a first direction, wherein each of the first touch electrodes is arranged correspondingly to the first trunk portion; and
a plurality of second touch electrodes disposed on the substrate along a second direction, wherein each of the second touch electrodes is arranged correspondingly to the second trunk portion;
wherein each of the first touch electrodes comprises a plurality of first spacers arranged at intervals and a plurality of first connecting portions arranged between adjacent first spacers;
a projection of the first trunk portion on the substrate correspondingly covers a projection of the first spacers on the substrate.

2. The touch display panel of claim 1, wherein each of the second touch electrodes comprises a plurality of second spacers arranged at intervals and a plurality of second connecting portions arranged between adjacent second spacers;
wherein a projection of the second trunk portion on the substrate correspondingly covers a projection of the second spacers on the substrate.

3. The touch display panel of claim 2, wherein a width of the first connecting portions is greater than a width of the first spacers, and a width of the second connecting portions is greater than a width of the second spacers.

4. The touch display panel of claim 1, wherein each of the first touch electrodes comprises a plurality of first touch sub-electrodes connected in parallel, and each of the first touch sub-electrodes is arranged correspondingly to the first trunk portion located in a same row.

5. The touch display panel of claim 1, wherein each of the second touch electrodes comprises a plurality of second touch sub-electrodes connected in parallel, and each of the second touch sub-electrodes is arranged correspondingly to the second trunk portion located in a same column.

6. The touch display panel of claim 1, wherein the touch display panel further comprises a plurality of data lines arranged along the first direction and a plurality of scan lines arranged along the second direction;
wherein the first touch electrodes and the data lines are arranged in a same layer, and the second touch electrodes and the scan lines are arranged in a same layer.

7. The touch display panel of claim 1, wherein the touch display panel further comprises a first connecting line and a second connecting line, and each of the first touch electrodes and each of the second touch electrodes comprise a first end and a second end that are oppositely disposed;
wherein the first ends of the plurality of first touch electrodes are electrically connected to the first connecting line, and the first ends of the plurality of second touch electrodes are electrically connected to the second connecting line; and
wherein the second end of one of the first touch electrodes and the second end of one of the second touch electrodes are both connected to a reference voltage.

8. The touch display panel of claim 7, wherein the touch display panel further comprises a display region and a non-display region set around the display region, and the first connecting line and the second connecting line are located in the non-display region.

9. The touch display panel of claim 1, wherein the materials of the first touch electrodes and the second touch electrodes are made of a material comprising any one kind of conductive materials with low resistivity such as copper, aluminum, silver, or molybdenum.

10. The touch display panel of claim 1, wherein the first trunk portion located in a same row is arranged correspondingly to one of the first touch electrodes, and the second trunk portion located in a same column is arranged correspondingly to one of the second touch electrodes.

11. A display device, comprising a touch display panel, the touch display panel comprising:
a substrate;
a plurality of pixel electrodes disposed on the substrate in an array, wherein each of the pixel electrodes comprises a first trunk portion and a second trunk portion that are arranged intersecting with each other;
a plurality of first touch electrodes disposed on the substrate along a first direction, wherein each of the first touch electrodes is arranged correspondingly to the first trunk portion; and
a plurality of second touch electrodes disposed on the substrate along a second direction, wherein each of the second touch electrodes is arranged correspondingly to the second trunk portion;
wherein each of the first touch electrodes comprises a plurality of first spacers arranged at intervals and a plurality of first connecting portions arranged between adjacent first spacers;
a projection of the first trunk portion on the substrate correspondingly covers a projection of the first spacers on the substrate.

12. The display device of claim 11, wherein each of the second touch electrodes comprises a plurality of second spacers arranged at intervals and a plurality of second connecting portions arranged between adjacent second spacers;
wherein a projection of the second trunk portion on the substrate correspondingly covers a projection of the second spacers on the substrate.

13. The display device of claim 12, wherein a width of the first connecting portions is greater than a width of the first spacers, and a width of the second connecting portions is greater than a width of the second spacers.

14. The display device of claim 11, wherein each of the first touch electrodes comprises a plurality of first touch sub-electrodes connected in parallel, and each of the first touch sub-electrodes is arranged correspondingly to the first trunk portion located in a same row.

15. The display device of claim 11, wherein each of the second touch electrodes comprises a plurality of second touch sub-electrodes connected in parallel, and each of the second touch sub-electrodes is arranged correspondingly to the second trunk portion located in a same column.

16. The display device of claim 11, wherein the touch display panel further comprises a plurality of data lines arranged along the first direction and a plurality of scan lines arranged along the second direction;
- wherein the first touch electrodes and the data lines are arranged in a same layer, and the second touch electrodes and the scan lines are arranged in a same layer.

17. The display device of claim 11, wherein the touch display panel further comprises a first connecting line and a second connecting line, and each of the first touch electrodes and each of the second touch electrodes comprise a first end and a second end that are oppositely disposed;
- wherein the first ends of the plurality of first touch electrodes are electrically connected to the first connecting line, and the first ends of the plurality of second touch electrodes are electrically connected to the second connecting line; and
- wherein the second end of one of the first touch electrodes and the second end of one of the second touch electrodes are both connected to a reference voltage.

18. The display device of claim 17, wherein the touch display panel further comprises a display region and a non-display region set around the display region, and the first connecting line and the second connecting line are located in the non-display region.

* * * * *